Jan. 19, 1932. R. SAMESREUTHER ET AL 1,841,762
HEAT EXCHANGE WALL FOR CONTAINERS
Filed June 20, 1927
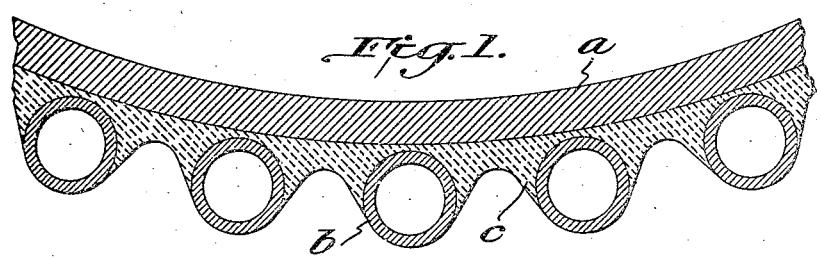
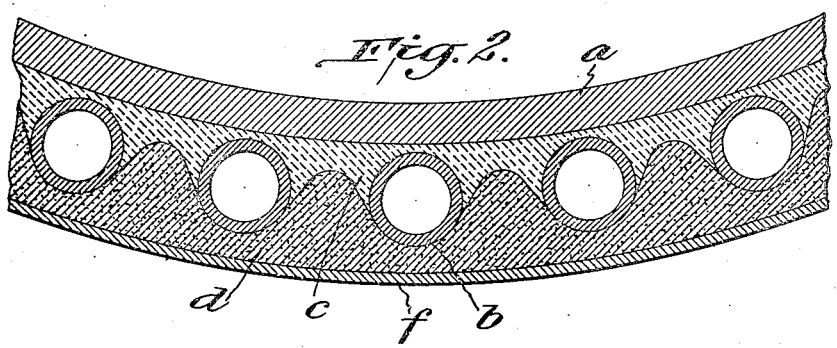
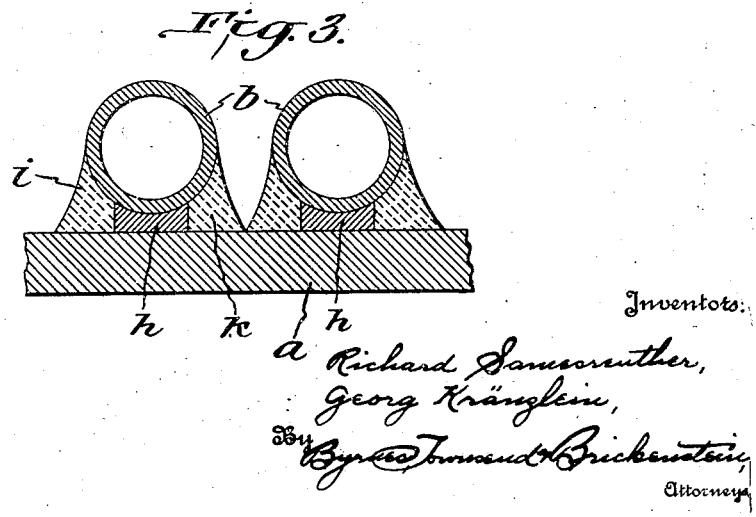
Inventors:
Richard Samesreuther,
Georg Kränzlein,
By Byrnes Townsend & Brickenstein
Attorneys Patented Jan. 19, 1932

1,841,762

UNITED STATES PATENT OFFICE

RICHARD SAMESREUTHER, OF BUTZBACH IN HESSEN, AND GEORG KRÄNZLEIN, OF HOCHST-ON-THE-MAIN, GERMANY, ASSIGNORS OF ONE-HALF TO I. G. FARBENINDUSTRIE AKTIENGESELLSCHAFT, OF FRANKFORT-ON-THE-MAIN, GERMANY, AND ONE-HALF TO SAMESREUTHER & CO., G. M. B. H., OF BUTZBACH IN HESSEN, GERMANY

HEAT EXCHANGE WALL FOR CONTAINERS

Application filed June 20, 1927, Serial No. 200,257, and in Germany June 22, 1926.

Our present invention relates to heat exchange walls for containers.

Plates or walls of vessels which are to be heated or cooled by passage of fluid through tubes carried thereby, have been made by embedding tubes in a cast iron plate during the casting operation. Since one side at least of the plate produced must be smooth a very thick plate is formed which is in itself objectionable in many cases. Moreover, cast iron is not a satisfactory material both because it has little resistance to chemical action and because it is not adapted to withstand high pressure.

According to our present invention such tubular plates or walls are made by welding tubes on the outer surface of a metal plate or metal vessel. This mode of construction has sundry advantages as compared with the use of cast iron in the manner described above. The possibility of welding the tubes to the plate or to the body of the vessel does not depend on the metal of which the plate or body consists, so that the most suitable metal may be used in each case. The thickness of the plate or body may be selected merely from the point of view of construction. Furthermore tubular walls made by our new method may have any desired shape, and the tubes may be of various forms besides rectilinear (such as coils, helices or grates) and of any desired diameter. Repairs and alterations are easily made. Transference of heat through the plate or wall is improved since welding can produce a closer union of the parts than is obtainable by casting iron around tubes.

The tubes may be welded to the surface which is to carry them by any of the known methods. For welding steel tubes to a metal wall which does not have the character of ingot iron or mild steel (for instance cast iron, nickel, Monel metal or the like) there may be used as welding skelp wires appropriate for the temperature of the welding and adapted to ensure an intimate union with the tubes of the said surface.

The welding operation (electric welding or autogenous welding) with the aid of the skelp produces a layer $c$ in which the tubes are partly embedded. It is preferable that the layers should be such that the entire half of the external surfaces of the tubes adjacent to the wall is embedded in the layer.

It is important that the welding operation should be so carefully performed that there are no faults in the weld, such as would impair the exchange of heat between the tubes and the plate or wall. The perfection of the weld not only depends on the skill and care of the operator but sometimes also on attendant circumstances which make it impossible for the most skillful workman to attain the desired perfection, that is to say to produce a weld from which air is excluded and in which there is no formation of slag. The space between the surface to which the tubes are to be welded is very narrow, so that it is not easily accessible; also the tubes do not always lie uniformly in contact with the surface and the irregularities are not easily seen. These circumstances make it difficult to ensure a close union free from slag of the tubes and the surface of the plate.

By our present invention a better union is ensured by pressing between the surface of a plate or wall and the tube a strip of soft metal with which the welding material unites closely on both its sides. These interposed metal strips (conveniently copper) serve to conduct the heat from the tube to the surface and vice versa, so that defective interchange of heat owing to imperfection of the weld is minimized.

The accompanying drawings illustrate our invention.

Fig. 1 is a cross section through a tube wall made according to the invention and Figs. 2 and 3 are like views of modifications.

$a$ represents the wall and $b$ the tubes welded to the outer surface thereof.

In Fig. 2 the tube wall is lagged by insulating material $d$ held in place by a sheet-iron jacket $f$.

Fig. 3 represents a section through a plate $a$ to which the tubes $b$ are welded. Between each tube and the surface of the plate is a metal strip $h$ which is rolled in such a manner that it fits on one side the shape of the tube and on the other the shape of the plate. In the operation of applying the tube the strip $h$ is placed between the tube and the plate and is then pressed in from one side, say the left hand side, whereupon the welding operation is performed on this side so that the welding material $i$ forms a layer attaching both the tube and the strip $h$ to the surface of the plate. The strip is then pressed on the other side (the right hand side) with the object of excluding all air and the welding operation is performed on this side, producing a layer of material $k$ which forms the attachment.

The strip $h$ may be of any suitable metal which is appropriately soft and of good heat conductivity. The welding operation is preferably electric welding.

We claim:

1. A plate or wall of a vessel having welded thereto a tube adapted for the passage of heating or cooling fluid with interposition of a strip of soft metal of good heat conductivity between the tube and the plate or wall.

2. A plate or wall of a vessel having welded thereto a tube which is embedded in metal and which is adapted for the passage of heating or cooling fluid with interposition of a strip of soft metal of good heat conductivity between the tube and the plate or wall.

3. A wall of a pressure vessel having welded thereto a tube by means of welding skelps, the tube being adopted for the passage of heating or cooling fluid and having welded strips of welding metal, the entire half of the surface of said tube adjacent to the wall being embedded in said welding metal.

In testimony whereof, we affix our signatures.

RICHARD SAMESREUTHER.
GEORG KRÄNZLEIN.